United States Patent
Hong

(10) Patent No.: US 8,443,388 B2
(45) Date of Patent: May 14, 2013

(54) DEVICE FOR RECEIVING BROADCASTING PROGRAM AND METHOD FOR DISPLAYING FAVORITE CHANNEL

(75) Inventor: Kyung Dug Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 249 days.

(21) Appl. No.: 12/672,815

(22) PCT Filed: Aug. 13, 2008

(86) PCT No.: PCT/KR2008/004693
§ 371 (c)(1),
(2), (4) Date: Feb. 9, 2010

(87) PCT Pub. No.: WO2009/022850
PCT Pub. Date: Feb. 19, 2009

(65) Prior Publication Data
US 2011/0214146 A1    Sep. 1, 2011

(30) Foreign Application Priority Data
Aug. 13, 2007 (KR) .................. 10-2007-0081278

(51) Int. Cl.
*H04N 5/445* (2011.01)
*H04N 9/00* (2006.01)
*H04N 7/17* (2006.01)
*G06F 3/00* (2006.01)

(52) U.S. Cl.
USPC ...... 725/46; 725/9; 725/39; 725/40; 348/563; 715/716

(58) Field of Classification Search .................. None
See application file for complete search history.

(56) References Cited

U.S. PATENT DOCUMENTS

| 5,444,499 | A |   | 8/1995  | Saitoh |
|-----------|---|---|---------|--------|
| 5,635,989 | A | * | 6/1997  | Rothmuller ................ 725/46 |
| 5,758,259 | A |   | 5/1998  | Lawler |
| 6,002,394 | A | * | 12/1999 | Schein et al. ................ 725/39 |
| 7,203,952 | B2| * | 4/2007  | Broadus .................... 725/40 |

(Continued)

FOREIGN PATENT DOCUMENTS

| CN | 1929595 A | 3/2007 |
|----|-----------|--------|
| EP | 1 274 189 | 1/2003 |

OTHER PUBLICATIONS

International Search Report dated Dec. 15, 2008.

(Continued)

*Primary Examiner* — Kristine Kincaid
*Assistant Examiner* — Oschta Montoya
(74) *Attorney, Agent, or Firm* — KED & Associates, LLP

(57) ABSTRACT

A device for receiving a broadcasting program and a method for displaying a favorite channel may be disclosed. A method for displaying a favorite channel in a device for receiving a broadcasting program includes presetting a favorite program viewing standard time; identifying whether a key signal is inputted by a user, displaying a broadcasting program received from a selected channel; detecting a viewing time of the program based on the inputted key signal; comparing the detected program viewing time with the preset viewing standard time; and registering the broadcasting program with a favorite program list based on the result of the comparison.

18 Claims, 5 Drawing Sheets

U.S. PATENT DOCUMENTS

| | | |
|---|---|---|
| 7,260,823 B2 * | 8/2007 | Schlack et al. ............... 725/9 |
| 2002/0104081 A1 | 8/2002 | Candelore et al. |
| 2002/0188948 A1 | 12/2002 | Florence |
| 2003/0115589 A1 | 6/2003 | D'Souza et al. |
| 2007/0174862 A1 | 7/2007 | Kushida et al. |
| 2008/0271078 A1 * | 10/2008 | Gossweiler et al. ........... 725/40 |

OTHER PUBLICATIONS

Chinese Office Action dated Jun. 21, 2012 with English Translation.
Supplementary European Search Report dated Oct. 23, 2012 for related European Application No. 08 79 3207.

* cited by examiner

DEVICE FOR RECEIVING BROADCASTING PROGRAM AND METHOD FOR DISPLAYING FAVORITE CHANNEL

TECHNICAL FIELD

The present invention relates to a device for receiving broadcasting programs. More specifically, the present invention relates to a device for receiving broadcasting programs which a user can register with a favorite channel list after viewing for a pre-determined time period, and a method for displaying a favorite channel by using the same.

BACKGROUND ART

Recently, accelerated digital broadcasting enables high definition and high quality sound broadcasting to start through a satellite, terrestrial and cable broadcasting system. Compared with a conventional analog television, a digital television may provide various additional services as well as high definition and high quality sound.

Such the digital television compresses high definition/high quality audio and video data (A/V data) by using A/V compression technology of MPEG-2 and AC-3 and transmits the compressed A/V to a user via a conventional satellite/terrestrial/cable band by using QPSK/VSB/QAM. As a result, various services can be supplied to a single channel.

A SD television may provide more than four channels of the terrestrial broadcasting with a conventional single channel and a HD television may provide one channel of the terrestrial broadcasting. Together with that, a digital television may transmit auxiliary information with A/V to provide various services. Thus, a kind of service such as a program guide for added channels may be supplied to the user.

Watching TV, the user may see information of the above program guide such as program titles, times, story lines and formats on a TV screen, which can be typically read on newspapers.

Moreover, because of the technology of A/V compression and the technology of transmission and compression, more channels can be broadcasted in the digital TV than in the analog TV. As a result, users should spend quite a time on finding channels that they want to see among the added channels.

As shown in FIG. 1, if the user registers only a favorite channel to a TV 10 and a key signal of a favorite channel is inputted via a user interface, a favorite channel list 30 set by the user is displayed in some portion of a screen 20 which is displaying a TV program such that the user may select the favorite channel conveniently.

DISCLOSURE OF INVENTION

Technical Problem

However, according to the conventional favorite channel list, only the channels set by the user as favorite ones are listed and supplied on the screen. This causes inconvenience in that the user should register the favorite channel every time.

Moreover, only channel numbers of the favorite channels set by the user are displayed. As a result, the user cannot recognize which program is broadcasted on the corresponding favorite channel. To recognize that, the use should change the channel into the corresponding favorite channel and this is inconvenient.

Technical Solution

To solve the problems, a method for displaying a favorite channel in a device for receiving a broadcasting program includes presetting a favorite program viewing standard time; identifying whether a key signal is inputted by a user, displaying a broadcasting program received from a selected channel; detecting a viewing time of the program based on the inputted key signal; comparing the detected program viewing time with the preset viewing standard time; and registering the broadcasting program with a favorite program list based on the result of the comparison.

The key signal inputted by the user may be a channel change signal or a power off signal.

If the power off signal is inputted, a total viewing time of the program broadcasted at the present may be detected.

If the detected viewing time of the program is more than the preset viewing standard time based on the result of the comparison, the program may be registered with the favorite program list.

If the detected viewing time of the program is less than the preset viewing standard time based on the result of the comparison, the detected viewing time of the program may be deleted.

The method according to the present invention may further include displaying at least one program stored in the favorite program list at a user s request, together with a broadcasting time statue for each corresponding program of the favorite channel program list.

The information of the broadcasting time statue for each program may be displayed in a bar type, differentiating a color of a broadcasted time area from a color of a to-be-broadcasted time area.

If the user selects a specific program, detailed information of selected program may be provided.

If a confirmation key signal corresponding to the program of which detailed information is provided is inputted, a channel viewed at the present may be changed into a channel broadcasting the corresponding program.

If a delete key corresponding to the program of which the detailed information is provided is inputted, the corresponding program may be deleted from the favorite channel list.

A device for receiving a broadcasting program according to the present invention includes a tuner for receiving a broadcasting program of a selected channel at the present; a program viewing time detection unit for detecting a total viewing time of the received program; a memory unit for storing the detected viewing time of the program, a favorite program viewing standard time preset by a user and a favorite program list; a user interface for receiving a key signal from the user; and a control unit for comparing the total viewing time of the received program with the preset favorite program viewing standard time if the key signal is inputted via the user interface, the control unit for registering the received program with the favorite channel program list or deleting the viewing time of the corresponding program stored in the memory unit based on the result of the comparison.

The key signal inputted from the user interface may be a channel change signal or a power off signal.

If the power off signal is inputted by the user, the program viewing detection unit may detect a total viewing time of the received program at the present.

The memory unit may update the detected viewing time information of the program continuously until the power off signal is inputted.

If the detected program viewing time is more than the preset viewing standard time based on the result of the comparison, the control unit may register the program at the present with the favorite channel list.

If the detected program viewing time is less than the preset viewing standard time based on the result of the comparison, the control unit may delete the detected program viewing time.

The device according to the present invention may further include a display unit for displaying at least one broadcasting program stored in the favorite channel list, with a broadcasting time status for each program at a user's request.

Information of the broadcasting time status may be displayed in a bar type, differentiating a color of a broadcasted time area from a color of a to-be-broadcasted time area.

If the user selects a specific program, the display unit may display detailed information of the selected program.

If a confirmation key signal corresponding to the program of which the detailed information is provided is inputted, the display unit may display the corresponding program after changing a channel at the present into a corresponding channel.

If a delete key signal corresponding to the program of which the detailed information is provided is inputted, the program may be deleted from the favorite channel list.

In another aspect, a method for displaying a favorite channel in a device for receiving a broadcasting program includes providing a broadcasting program of a selected channel; requesting a list of the other favorite programs broadcasted at the same time as the selected program broadcasted at the present out of a stored favorite channel list; displaying an OSD of the requested list of the programs; receiving an input signal for selecting a specific program out of the displayed list of the programs; displaying detailed information of the selected program; and changing the channel at the present into a channel corresponding to the selected program or deleting the selected program from the favorite channel program list based on a key signal inputted during the displaying of the detailed information.

The requested list of the favorite programs at the present may be displayed together with information of a broadcasting time stature for each program.

The broadcasting time status may be provided in a bar type, differentiating a color of a color of a broadcasted time area from a color of a to-be-broadcasted time area.

Advantageous Effects

The present invention has following advantageous effects.

If a channel change signal or a power off signal is received according to the device for receiving a broadcasting program, a viewing time of a program viewed by a user is detected. If the detected viewing time is more than a predetermined time period, the program is automatically registered with a favorite channel list.

Furthermore, detailed information of a specific program selected by the user from a favorite channel list is displayed together with information of the other program broadcasting at the same time as the selected program. The user may change a present channel into another channel selected from the favorite channel list or delete the selected program.

BRIEF DESCRIPTION OF THE DRAWINGS

The accompanying drawings, which are included to provide further understanding of the disclosure and are incorporated in and constitute a part of this application, illustrate embodiments of the disclosure and together with the description serve to explain the principle of the disclosure.

In the drawings.

BEST MODE FOR CARRYING OUT THE INVENTION

Reference will now be made in detail to the specific embodiments of the present invention, examples of which are illustrated in the accompanying drawings. Wherever possible, the same reference numbers will be used throughout the drawings to refer to the same or like parts.

In reference to the drawings, a device for receiving a broadcasting program according to an exemplary embodiment and a method for displaying a favorite channel by using the same will be described.

Figure 1:
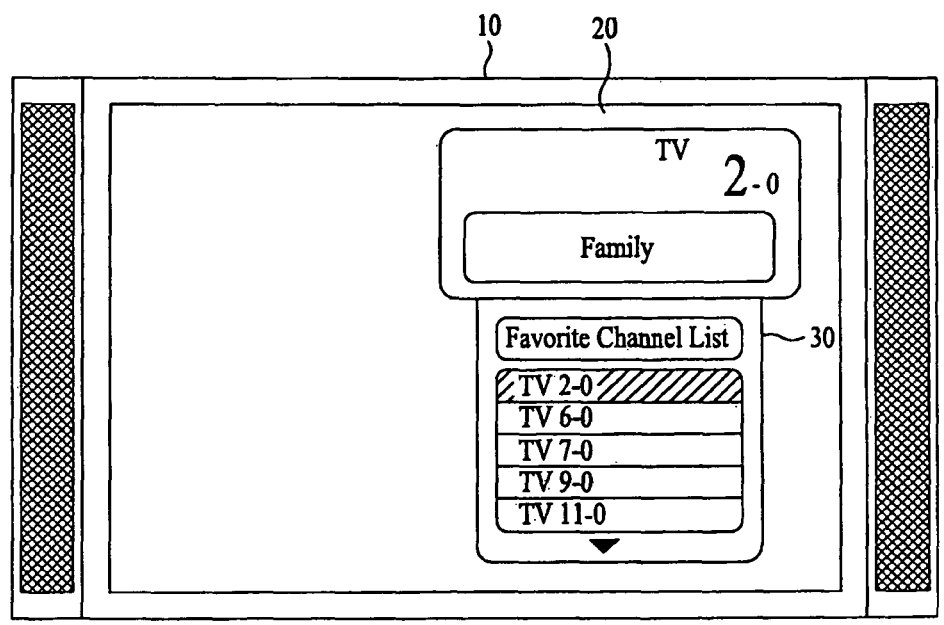
FIG. 1 is a diagram illustrating a screen of a conventional TV, with a favorite channel menu.
Figure 2:
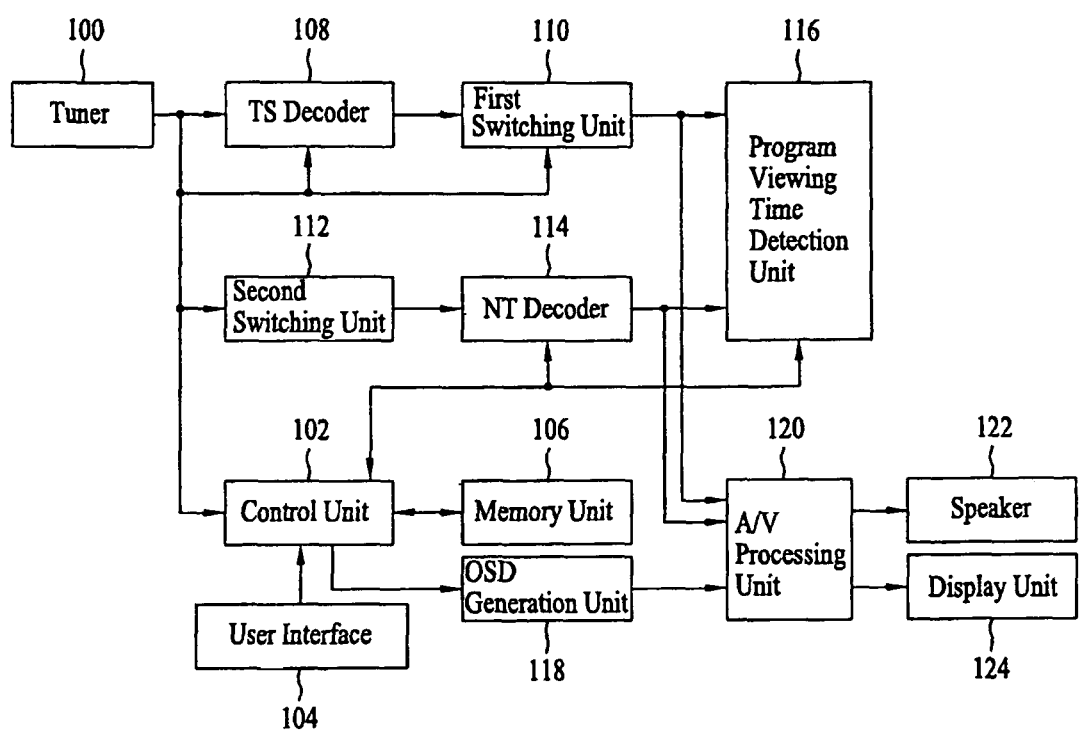
FIG. 2 is a block view schematically illustrating a configuration of a broadcasting receiver according to en exemplary embodiment.

FIG. 2 is a block view schematically illustrating a configuration of the device for receiving a broadcasting program (hereinafter, a broadcasting receiver).

As shown in FIG. 2, a broadcasting receiver according to an exemplary embodiment is a TV that receives broadcasting programs from broadcasting stations. The TV includes a control unit 102, a user interface 104, a memory unit 106, a tuner 100, a TS decoder 108, an NT decoder 114, a program viewing time detection unit 116 and an audio/video (A/V) processing unit 120. The control unit 102 generally controls the TV. A user inputs a channel change signal or a power on/off signal via the user interface 104. In the memory unit 106 are memorized a favorite program viewing standard time set by the user, information of the channel viewing time and information of the channels registered as favorite channels. The tuner 100 performs tuning of broadcasting channels in accordance with the control of the control unit 102. The TS decoder 108 processes a digital broadcasting signal and the NT decoder 114 processes an analog broadcasting signal. The program viewing time detection unit 116 detects the viewing time of the program selected and viewed by the user. The A/V processing unit 120 processes broadcasting data provided by the digital or analog signal to be outputted via a speaker 122 and a displayer 124.

The control unit 102 controls the TV generally as mentioned above. Specifically, if a channel change signal or a power control signal is inputted via the user interface 104 according to the embodiment, the control unit 102 determines whether a program broadcasted at the present is viewed for more than the favorite program viewing standard time and it controls the program at the present to be registered with a favorite channel list based on the result of the determination.

In addition, if the signal inputted via the user interface 104 is a power off signal and the total viewing time of the program at the present is less than the favorite program viewing standard time, the control unit 102 deletes information of the program viewing time at the present which is memorized in the memory unit 106.

If a signal of requesting to display the list of programs stored in the memory unit 106 as favorite program, the control unit 102 displays the information of the program viewed at the present or the information of plural favorite channel programs broadcasted on the other channels at the present.

At this time, if a specific program is selected from the favorite channel list by the user, detail information of the selected broadcasting program is displayed. Hence, if a signal of channel change to the selected channel broadcasting the corresponding program is inputted and if a signal of deleting the selected program is inputted, the selected program is deleted from the favorite channel list.

The user interface 104 transmits to the control unit 102 various kinds of command signals or information that are inputted via a keypad or remote control by the user. Especially, according to this embodiment, the user interface 104 transmits to the control unit 102 a signal of selecting a specific program from the favorite channel list, a signal of changing a channel to the selected program or a signal of deleting the selected program.

The memory unit 106 stores various pieces of information including a system program of the control unit 102. In addition, the favorite program viewing standard time preset by the user, the information of the program viewed time and the information of plural channels registered as favorite channels are memorized in the memory unit 106.

The tuner 100 tunes the channels controlled by the control unit 102 out of broadcasting data inputted via the terrestrial or cable. Thus, the tuner 100 transmits digital signals received via the tuned channels to the TS decoder 108 for processing a digital broadcasting signal and analog signals received via the tuned channels to the NT decoder 114 for processing an analog signal.

Here, the tuner 100 receives a broadcasting program selected at the present and displays the program on the screen.

The TS decoder 108 decodes the digital signal supplied by the tuner 100 and it converts the digital signal into an A/V stream or a data stream to transmit the streams to a first switching unit 110.

The first switching unit 110 processes the A/V stream and the data stream into a broadcasting signal in accordance with the control of the control unit 102. Hence, the first switching unit 110 transmits the processed signal to the A/V processing unit 120 to output the broadcasting. In addition, the first switching unit 110 transmits auxiliary data included in the broadcasting program received via the tuner 100 to the program viewing time detecting unit 116.

A second switching unit 112 is further provided. The second switching unit 112 receives the analog broadcasting signal from the tuner 100 and an external input signal. Hence, the second switching unit 112 selects and transmits either of the two signals to the NT (STSC) decoder 114 in accordance with the control of the control unit 102.

The NT (NTSC) decoder 114 for processing the analog broadcasting signal receives the analog broadcasting signal or the external input signal from the second switching unit 112 to decode it into an audio and video data. Especially, in this embodiment, the NT decoder 114 transmits the auxiliary data included in the broadcasting program received from the tuner 100 to the program viewing time detection unit 116 in accordance with the control of the control unit 102.

The program viewing time detection unit 116 detects the total broadcasting time of the corresponding program and the viewing time of the corresponding program viewed by the user from the auxiliary data of the program received from the tuner 100. As a result, if the channel change signal or the power control signal is inputted by the user, the program viewing time detection unit 116 transmits either of the two signals to the control unit 102.

At this time, the control unit 102 determines whether the corresponding program is viewed as long as the favorite program viewing standard time, that is, whether the program is viewed for more than the preset favorite program viewing standard time out of the total program broadcasting time by using the information of the corresponding program transmitted by the program viewing time detection unit 116. Based on the result of the determination, the control unit 102 automatically registers the program viewed for more than the favorite program viewing standard time with the favorite channel list.

The A/V processing unit 120 processes the audio data and the video data of the program received from the first switching unit 112 such that the processed audio data is outputted to the speaker 122 and the video data is outputted to the display unit 124. In addition, the A/V processing unit 120 mixes an OSD data provided by the control unit 102 with the video data and it transmits the mixed data to the display unit 124.

Here, the OSD data displayed on the screen of the broadcasting receiver is the favorite channel list which is displayed at a predetermined area of the screen in a block type at a user' request. Such the favorite channel list is configured of a bar type including titles and broadcasting times of programs.

In addition, a specific program selected by the user from the favorite channel list is highlighted and detailed information of the selected program, that is, the highlighted program is displayed adjacent to the list of the programs.

In reference to FIGS. 3 to 5, a method for displaying a favorite channel according to an exemplary embodiment that is applicable to the device for automatically listing the favorite channels as mentioned above will be described.

Figure 3:
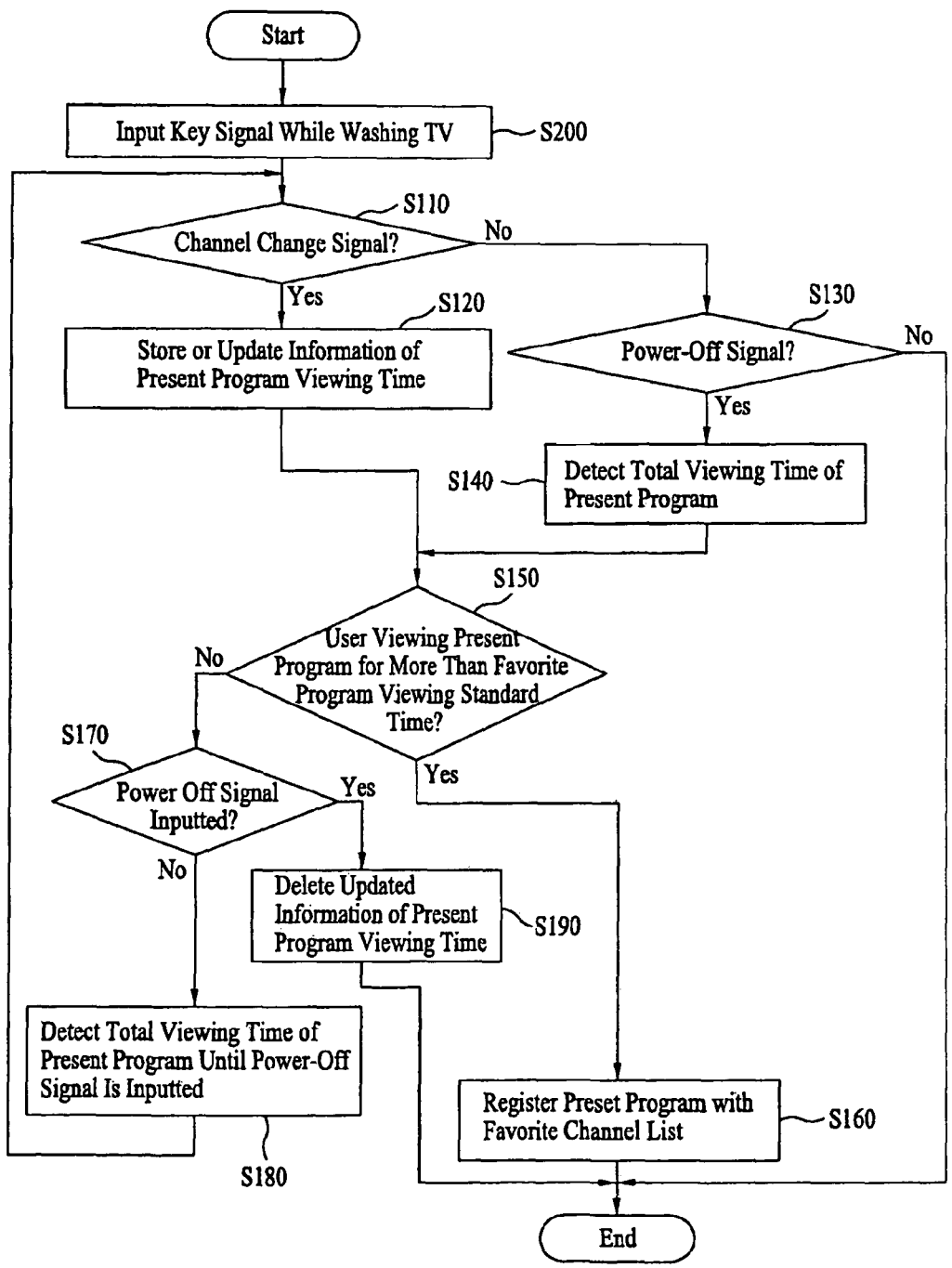
FIG. 3 is a flow chart illustrating a process of registering a broadcasting program to a favorite channel list according to the embodiment.

FIG. 3 is a flow chart illustrating a process of registering a broadcasting program to the favorite channel list according to an exemplary embodiment.

As shown in FIG. 3, the broadcasting receiver receives a program selected by the user from the tuner 100 and it displays the selected program on the screen. Here, it is checked whether a key signal corresponding to a channel change signal or a power off signal is inputted by the user (S100).

Hence, if the key signal is inputted by the user, it is determined whether the inputted key signal is the channel change one (S110). If the key signal is the channel change signal, the program viewing time detection unit 116 transmits to the control unit 102 the total broadcasting time of the program viewed at the present and the total viewing time of the corresponding program by using the auxiliary information included in the received broadcasting signal.

Then, the control unit 102 stores the information of the program viewing time viewed at the present in the memory unit 106 or the control unit 102 updates the total viewing time in the memory unit 106 if information of the program at the present is already stored in the memory unit 106 (S120).

After that, it is determined whether the total viewing time of the corresponding program stored in the memory unit 106 is longer than the favorite program viewing standard time preset by the user (S150).

Based on the result of the determination, if the total viewing time of the program is over the favorite program viewing standard time preset by the user, the control unit 102 automatically registers and stores the corresponding program with and in the favorite channel list (S160).

If the total viewing time of the corresponding program is less than the favorite program viewing standard time, the control unit 102 identifies wither the power off signal of the broadcasting receiver is inputted (S170).

Based on the result of the identification, if the power off signal is not inputted, the control unit 102 repeatedly updates the viewing time of the corresponding program in the memory unit 106 and it performs continuously S120 to S180 until the power off signal is inputted.

In contrast, if the power off signal is inputted in S170, it means that the power off signal is inputted in a state of the corresponding program being viewed for less than a predetermined time period. As a result, the control unit 102 deletes the information of the program viewed at the present together with the updated time information of the corresponding program stored in the memory unit 106, that is, the total viewing time (S190).

In the meantime, if the key signal inputted by the user in 5110 is not the channel change signal, the control unit 102 determines whether the inputted key signal is the power off signal (S130).

Based on the result of the determination, if the key signal inputted by the user is the power off signal, the control unit 102 controls the program viewing time detection unit 116 and the program viewing time detection unit 116 transmits to the control unit 102 the total broadcasting time of the program viewed at the present and the total viewing time of the corresponding program by using the auxiliary information included in the broadcasting signal (S140).

Then, the control unit 102 determines whether the total viewing time of the program at the present stored in the memory unit 106 is more than the favorite program viewing standard time preset by the user (S150).

Based on the result of the determination, if the total viewing time stored in the memory unit 106 is more than the preset favorite program viewing standard time, the control unit 102 automatically registers the corresponding program with the favorite channel list (S160).

In contrast, if the total viewing time stored in the memory unit 106 is less than the favorite program viewing standard time preset by the user, the control unit 102 determines that the power off signal is inputted and the control unit 102 deletes the information of the corresponding program together with the updated time information of the corresponding program, that is, the information of the total viewing time of the corresponding program (S190).

Figure 4:
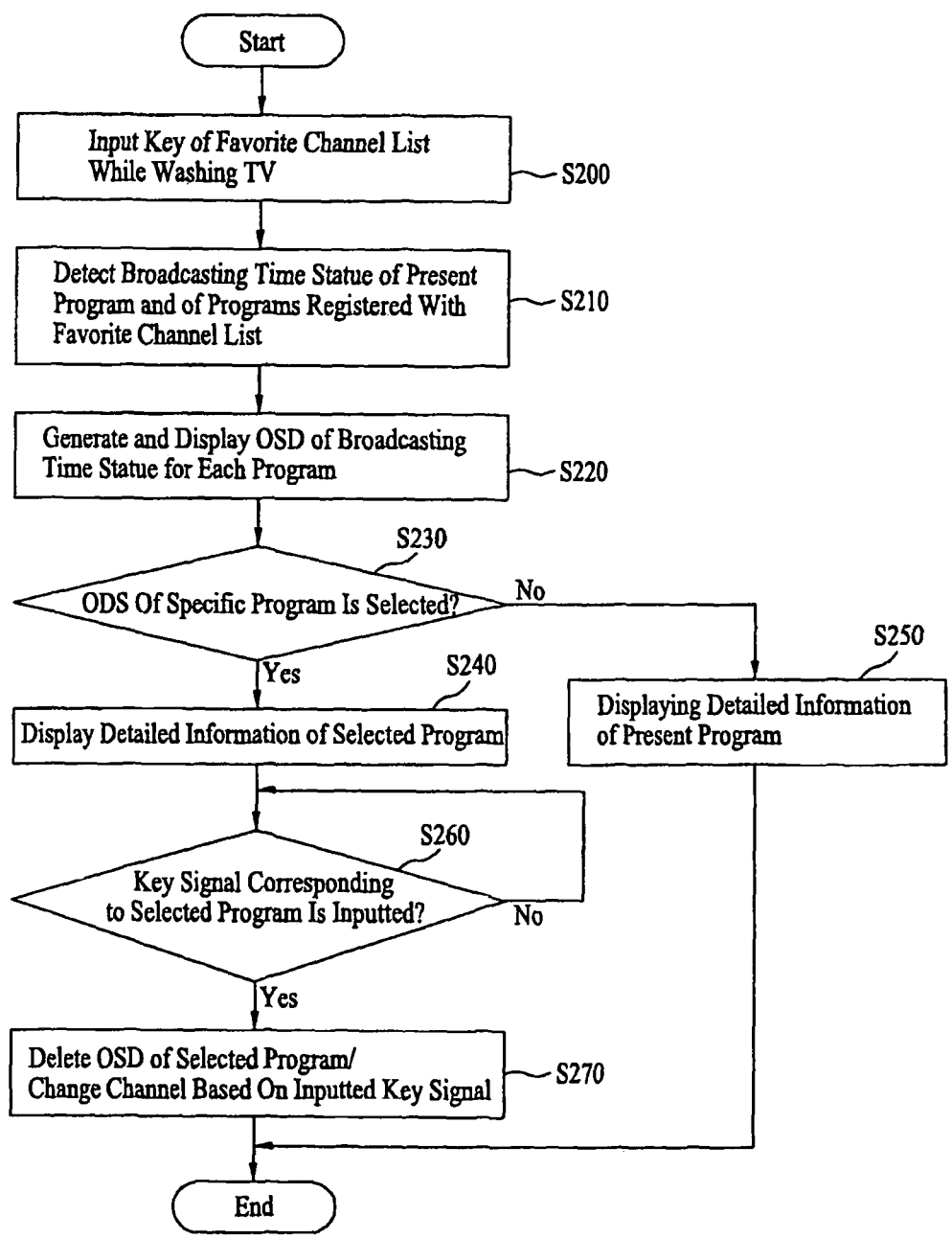
FIG. 4 is a flow chart illustrating a process of providing information of the registered program with the favorite channel list according to the embodiment.

FIG. 4 is a diagram illustrating a process of displaying the information of the program registered with the favorite channel list through the process of FIG. 3. In reference to FIG. 4, the process will be described in detail.

FIG. 4 is a flow chart illustrating a process of providing the program registered to the favorite channel list according to the embodiment.

As shown in FIG. 4, if the user inputs a favorite program list key for requesting a favorite channel list via the user interface 104 (S200), the control unit 102 detects the information of the program viewed by the user at the present and the information of the programs stored in the favorite channel list. Then, the control unit 102 controls the program viewing time detection unit 116 to detect the information of a broadcasting time status for each program registered with the detected favorite channel list (S210).

At this time, the program viewing detection unit 116 transmits the information of the plural programs stored in the favorite channel list to the control unit 102 by using the electronic program guide. The control unit 102 detects the broadcasting time status for each program at the present based on the detected program information, corresponding to the present time.

Hence, the information of the plural programs registered with the favorite channel list is displayed at a predetermined area of screen in a block based on an OSD data. Simultaneously, an OSD of the broadcasting time status information for each program is generated and it is displayed in a bar type together with the information of the corresponding program (S220).

It is checked whether an area of a specific program at the OSD data for displaying the favorite channel list is selected by the user (S230).

Here, if the area of the specific program is selected from the OSD data of the favorite channel list by the user, the control unit 102 highlights the block of the OSD for the selected program and detailed information of the selected program is provided with a predetermined area of the screen (S240).

If a specific program is not selected by the user, the control unit 102 provides detailed information of the program viewed at the present by the user (S250).

Continuously, it is identified whether a confirmation key signal for the program selected and highlighted by the user is inputted (S260).

If the confirmation key for the selected and highlighted program is inputted, the control unit 102 changes the present channel into a channel broadcasting the selected program, corresponding to the key signal.

If a key signal for deleting the selected program is inputted, the control unit 102 deletes the OSD data of the selected program corresponding to the key signal and deletes the information of that program from the favorite channel list (S270).

Figure 5:
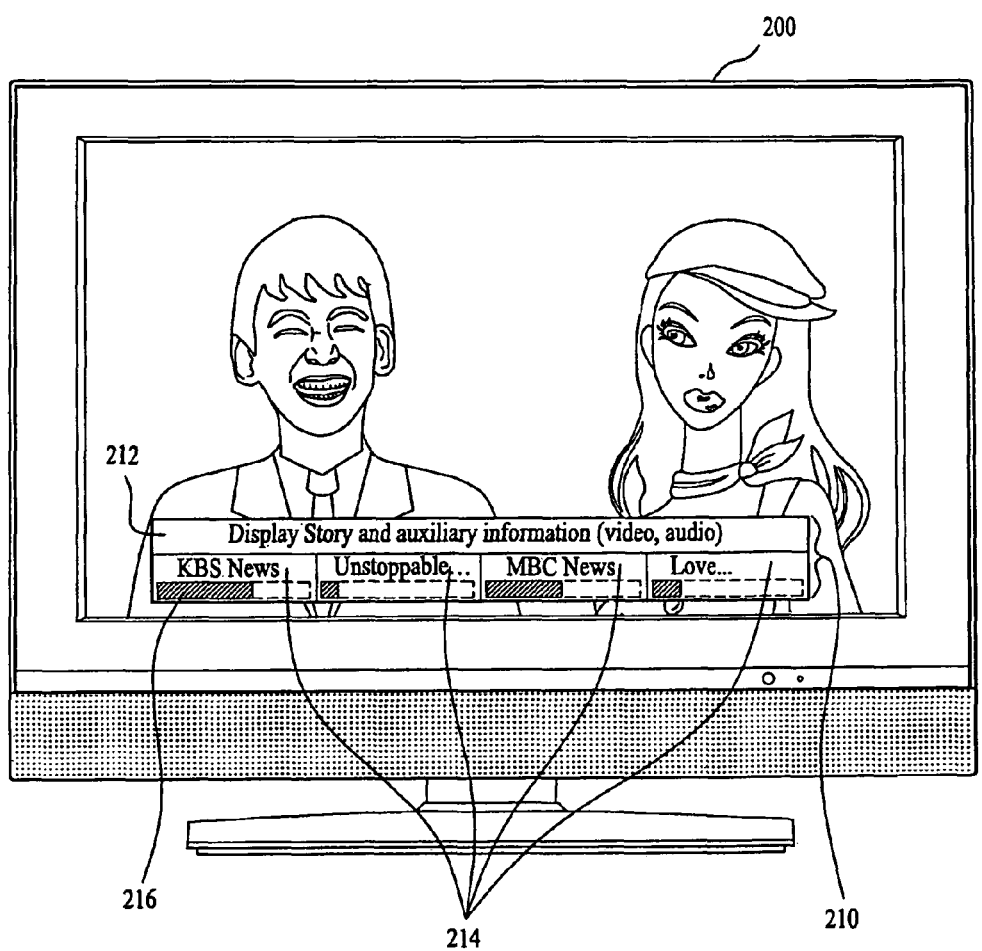
FIG. 5 is a diagram of a screen illustrating the favorite channel list according to the embodiment.

FIG. 5 is a diagram illustrating a screen displaying the favorite channel list according to the embodiment.

In reference to FIG. 5, a signal for requesting the favorite channel list is inputted by the user and the favorite channel list is displayed at a predetermined area of the screen.

The programs of the OSD data 210 from the favorite channel list of the broadcasting receiver 200 are four programs 214 including 'KBS (Korea Broadcasting Station) News', 'Unstoppable', 'MBC (Munwha Broadcasting Center) News' and 'love' that are viewed at the present and broadcasted on other channels at the same time. A bar 216 for displaying the broadcasting time status for each program is displayed under each title of the programs.

If the user selects a specific program from the OSD 210 of the favorite channel list, the control unit 102 highlights a corresponding block of the selected program and displays detailed information 212 of the selected program in an upper area of the OSD.

Here, if a confirmation key signal of the highlighted program is inputted, the control unit 102 changes the channel at the present into a channel corresponding to the highlighted program.

In the meantime, if the user inputs a delete key signal of the highlighted program, the control unit 102 deletes the OSD data of the selected program and deletes the selected program from the favorite channel list simultaneously.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Industrial Applicability

The present invention has an industrial applicability as follows.

If a channel change signal or a power off signal is received according to the device for receiving a broadcasting program, a viewing time of a program viewed by a user is detected. If the detected viewing time is more than a predetermined time period, the program is automatically registered with a favorite channel list.

Furthermore, detailed information of a specific program selected by the user from a favorite channel list is displayed together with information of the other program broadcasting at the same time as the selected program. The user may change a present channel into another channel selected from the favorite channel list or delete the selected program.

The invention claimed is:

1. A method for controlling display of a broadcasting program comprising:
presetting a favorite program viewing standard time;
identifying whether a key signal is received;
displaying a broadcasting program received from a selected channel;
detecting a viewing time of the program based on the received key signal;
comparing the detected program viewing time with the preset viewing standard time;
registering the selected channel of the broadcasting program with a favorite channel list in a memory based on a result of the comparison, wherein the favorite channel list includes a plurality of favorite channels;
calculating a remaining time for programs currently broadcast on the plurality of favorite channels listed in the favorite channel list based on a current time and electronic program guide (EPG) information;
generating on-screen display (OSD) data that identifies the programs currently broadcast on the plurality of favorite channels listed in the favorite channel list, wherein the OSD data includes a plurality of progress bars indicating the calculated remaining time of the programs currently broadcast on the plurality of favorite channels; and
displaying the plurality of progress bars indicating the calculated remaining time of the programs currently broadcast on the plurality of favorite channels while displaying the broadcast program of the selected channel.

2. The method as claimed in claim 1, wherein the received key signal is a channel change signal or a power off signal.

3. The method as claimed in claim 2, wherein:
if the power off signal is received at a time when the detected program viewing time is less than the preset viewing standard time, deleting a total viewing time of the program displayed through the selected channel.

4. The method as claimed in claim 1, wherein:
if the detected viewing time of the program is greater than the preset viewing standard time based on the result of the comparison, the program of the selected channel is registered with the favorite program list.

5. The method as claimed in claim 1, wherein:
if the detected viewing time of the program is less than the preset viewing standard time based on the result of the comparison, the detected viewing time of the program of the selected channel is deleted.

6. The method as claimed in claim 1, further comprising displaying detailed information of one of the programs identified by the OSD data when said one of the programs identified by the OSD data is selected.

7. The method as claimed in claim 6, further comprising:
receiving a confirmation key signal corresponding to said selected one of the programs identified by the OSD; and
changing display of the program on the selected channel to the favorite channel broadcasting said selected one of the programs identified by the OSD.

8. The method as claimed in claim 6, further comprising:
receiving a delete key corresponding to said selected one of the programs identified by the OSD; and
deleting said selected one of the programs from the displayed OSD data.

9. A device for controlling display of a broadcasting program comprising:
a tuner to receive a broadcasting program of a selected channel;
a program viewing time detector to detect a total viewing time of the received program;
a memory to store information indicative of the detected viewing time of the received program, a favorite program viewing standard time preset by a user and a favorite channel list that includes a plurality of favorite channels;
an interface to receive a key signal;
a controller to compare the total viewing time of the received program with the preset favorite program viewing standard time after the key signal is received by an interface, the controller to register the selected channel of the received program with the favorite channel program list or to delete the information indicative of the viewing time of the received program stored in the memory based on a result of the comparison, and the controller to calculate a remaining time for programs currently broadcast on the plurality of favorite channels listed in the favorite channel list based on a current time and electronic program guide (EPG) info information;
an on-screen display (OSD) generator to generate OSD data that identifies the programs currently broadcast on the plurality of favorite channels listed in the favorite channel list, wherein the OSD data includes a plurality of progress bars indicating the calculated remaining time of the programs currently broadcast on the plurality of favorite channels; and
a display to display the plurality of progress bars indicating the calculated remaining time of the programs currently broadcast on the plurality of favorite channels simultaneously while displaying the OSD data and the broadcast program of the selected channel.

10. The device as claimed in claim 9, the received key signal is a channel change signal or a power off signal.

11. The device as claimed in claim 9, wherein, when the received key signal is the power off signal, the program viewing detector detects a total viewing time of the received program.

12. The device as claimed in claim 9, wherein the controller updates the detected viewing time information of the received program stored in the memory until the power off signal is received.

13. The device as claimed in claim 9, wherein, when the detected viewing time of the received program is greater than the preset viewing standard time based on the result of the comparison, the controller registers the received program of the selected channel with the favorite channel list.

14. The device as claimed in claim 9, wherein, when the detected viewing time of the received program is less than the preset viewing standard time based on the result of the comparison, the controller deletes information indicative of the detected viewing time of the received program from the memory.

15. The device as claimed in claim 9, wherein, when the detected viewing time of the received program is less than the preset viewing standard time based on the result of the comparison, the controller deletes the information indicative of the detected viewing time of the received program from the memory.

16. The device as claimed in claim 15, wherein the OSD generator generates for display detailed information of one of programs identified by the OSD data after said one of the programs identified by the OSD data is selected.

17. The device as claimed in claim 15, wherein, when a confirmation key signal is received corresponding to said selected one of the programs identified by the OSD data, the display displays said selected one of the programs.

18. The device as claimed in claim 15, wherein, when a delete key signal is received corresponding to said selected one of the programs, the controller deletes said selected one of the programs from the favorite channel list.

* * * * *